United States Patent
Xu et al.

(10) Patent No.: US 10,290,049 B1
(45) Date of Patent: May 14, 2019

(54) SYSTEM AND METHOD FOR MULTI-USER AUGMENTED REALITY SHOPPING

(71) Applicants: Beijing Jingdong Shangke Information Technology Co., Ltd., Beijing (CN); JD.com American Technologies Corporation, Mountain View, CA (US)

(72) Inventors: Yi Xu, Menlo Park, CA (US); Yuzhang Wu, Santa Clara, CA (US); Hui Zhou, Sunnyvale, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 0 days.

(21) Appl. No.: 16/020,945

(22) Filed: Jun. 27, 2018

Related U.S. Application Data

(63) Continuation-in-part of application No. 16/020,920, filed on Jun. 27, 2018.

(51) Int. Cl.
  *G06T 19/00* (2011.01)
  *G06Q 30/06* (2012.01)
  *G06T 19/20* (2011.01)
  *G06T 17/05* (2011.01)

(52) U.S. Cl.
  CPC ..... *G06Q 30/0643* (2013.01); *G06Q 30/0627* (2013.01); *G06T 17/05* (2013.01); *G06T 19/006* (2013.01); *G06T 19/20* (2013.01)

(58) Field of Classification Search
  None
  See application file for complete search history.

(56) References Cited

PUBLICATIONS

McDonald et al. "Real-time 6-DOF multi-session visual SLAM over large-scale environments", 2013. (Year: 2013).*
Forster et al., "Collaborative Monocular SLAM with Multiple Micro Aerial Vehicles" 2013. (Year: 2013).*
Apple Inc., ARKit, https://developerapple.com/arkit/.
Google LLC, ARCore, https://developers.google.com/ar/.
Tong Qin, Peiliang Li, & Shaojie Shen, VINS-Mono: A Robust and Versatile Monocular Visual-Inertial State Estimator, arXiv, 2017, 1708.03852.
Matt Miesnieks, Why is ARKit better than the alternatives?, https://medium.com/6d-ai/why-is-arkit-better-than-the-alternatives-af8871889d6a.
Wikipedia, Point set registration, https://en.wikipedia.org/wiki/Point_set_registration.

* cited by examiner

*Primary Examiner* — Nicholas R Wilson
(74) *Attorney, Agent, or Firm* — China Science Patent & Trademark US LLC; Shanyun Lu

(57) ABSTRACT

A system and method for realizing multi-user augmented reality. The system includes a first and second computing devices in communication with each other, and respectively constructing a first and a second three-dimensional (3D) maps of a same environment at different viewing angles and positions. The first and second computing devices are configured to assign one of the 3D maps as a reference map, and align the other one of the 3D maps to the reference map, such that the 3D maps have the same coordinate system. A 3D model of a product is also placed and rendered in the two 3D maps, and the operation of the 3D model in one computing device is reflected in the other computing device at real time.

20 Claims, 3 Drawing Sheets

SYSTEM AND METHOD FOR MULTI-USER AUGMENTED REALITY SHOPPING

CROSS-REFERENCE TO RELATED APPLICATIONS

This application is a continuation-in-part application of the U.S. application Ser. No. 16/020,920 filed Jun. 27, 2018, entitled "SYSTEM AND METHOD FOR MOBILE AUGMENTED REALITY," by Yuzhang Wu, Yi Xu, Dan Miao and Hui Zhou, which are incorporated herein in their entireties by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to augmented reality, and more particularly to augmented reality shopping for multi-users.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

Augmented reality (AR) is a direct or indirect live view of a physical, real-world environment whose elements are "augmented" by computer-generated perceptual information, ideally across multiple sensory modalities, including visual, auditory, haptic, somatosensory, and olfactory. A user may use AR to combine virtual objects with real environment and bring a feeling that virtual objects are part of the real world. With the wide adoption of mobile devices and wearable devices, AR is easily accessible to consumers for gaming, shopping, education, sightseeing, etc. However, it is inconvenient for multiple users to do AR shopping using one device.

Therefore, an unaddressed need exists in the art to address the aforementioned deficiencies and inadequacies.

SUMMARY OF THE INVENTION

In certain aspects, the present invention relates to a system for realizing multi-user augmented reality. In certain embodiments, the system includes a computing device. The computing device has a secondary visual sensor, a processor and a storage device storing computer executable code. The computer executable code, when executed at the processor, is configured to: receive information of a product from a primary computing device to obtain three-dimensional (3D) model of the product; receive a primary 3D map of environment from the primary computing device either directly or indirectly; obtain secondary images captured by the secondary visual sensor; construct a secondary 3D map of the environment based on the obtained secondary images; align the secondary 3D map with the primary 3D map to form an aligned secondary 3D map; and upon receiving a position and orientation of the 3D model in the primary 3D map, place and render the 3D model of the product in a corresponding position and orientation in the updated secondary 3D map. In certain embodiments, the computing device doesn't receive at least one of the 3D map and the 3D model (or product ID) directly from the primary computing device. Instead, the primary computing device uploads at least one of the 3D map and the 3D model (or product ID) to a server computing device, and the computing device receives or retrieves the 3D map and/or the 3D model (or product ID) from the server computing device.

In certain embodiments, the primary computing device has a primary visual sensor, and the primary computing device is configured to construct the primary 3D map based on primary images captured by the primary visual sensor.

In certain embodiments, the primary computing device further has a primary processor and a primary storage device storing primary computer executable code. The primary computer executable code, when executed at the primary processor, is configured to: retrieve the 3D model of the product based on a selection of a primary user of the primary computing device; send the 3D model of the product and the primary 3D map of the environment to the computing device; and establish a primary-secondary relationship with the computing device. In certain embodiments, the primary computing device sends the product ID instead of the 3D model to the computing device, and the computing device can retrieve the 3D model from a server using the ID. In certain embodiments, the primary computing device uploads the 3D map to the server, and the computing device downloads the 3D map from the server.

In certain embodiments, the computer executable code is configured to align the secondary 3D map to the primary 3D map by: matching secondary feature points in the secondary 3D map to primary feature points in the primary 3D map to obtain matched feature points; and transforming coordinate system of the secondary 3D map to primary coordinate system of the primary 3D map based on the matched feature points.

In certain embodiments, the computer executable code is configured to align the secondary 3D map to the primary 3D map by: fitting a secondary model to the points in the secondary 3D map, fitting a primary model to the points in the primary 3D map, transforming coordinate system of the secondary 3D map to the primary coordinate system of the primary 3D map based on the fitted models. In certain embodiments, the model can be a polygonal mesh or spline surfaces.

In certain embodiments, the computer executable code is configured to align the secondary 3D map to the primary 3D map by: matching feature points in at least one key frame of the secondary 3D map to feature points in at least one primary key frame of the primary 3D map to obtain matched feature points; and transforming coordinate system of the secondary 3D map to the primary coordinate system of the primary 3D map based on the matched feature points.

In certain embodiments, the transformation that used to align the secondary 3D map with the primary 3D map is a rigid transformation in 3D space, which comprises of a rotation and a translation; and the rotation has three degrees of freedom and the translation has three degrees of freedom. In certain embodiments, the gravity direction is estimated using the motion sensing hardware on smart phones; and the Y axis of the coordinate system of the secondary 3D map and the Y axis of the coordinate system of the primary 3D map point to the opposite direction of gravity; and the rotation part of the rigid transformation only has one degree of freedom; and it is easier to align the secondary 3D map with the primary 3D map. In certain embodiments, transformation is performed based on key frames from the primary and secondary 3D maps.

In certain embodiments, the alignment is computed by minimizing an error term. In certain embodiments, the error term can be calculated as average of the squared distances between corresponding feature points. In another embodiments, the error term can be defined as average of the squared distances between sampled points from parametric surface models of the primary 3D map and the secondary 3D map.

In certain embodiments, when the transformation between the two 3D maps are calculated, the two 3D maps can be aligned using the calculated transformation.

In certain embodiments, the primary 3D map and the secondary 3D map are updated at real time, and the computer executable code is further configured to evaluate the alignment between the secondary 3D map and the primary 3D map by: calculating squared distances between matched feature points between the primary 3D map and the aligned secondary 3D map; comparing the average of the squared distances to a predetermined threshold; and when the average of the squared distances is greater than the predetermined threshold, performing the step of aligning the secondary 3D map to the primary 3D map again after a predetermined period of time. In certain embodiments, when the average of the squared distances is greater than the predetermined threshold, the primary computing device and the computing device are configured to guide users to capture primary images and secondary images at a common area of the environment.

In certain embodiments, the primary computing device further comprises a primary inertial measure unit (IMU) for collecting primary inertial information, the computing device further comprises a secondary IMU for collecting secondary inertial information, the primary computing device is configured to construct the primary 3D map and determine poses of the primary computing device based on the captured primary images and the collected primary inertial information, and the computing device is configured to construct the secondary 3D map and determine poses of the computing device based on the captured secondary images and the collected secondary inertial information.

In certain embodiments, the system further includes at least one secondary computing device in communication with the primary computing device, wherein the at least one secondary computing device is configured to align its 3D map with the primary 3D map.

In certain embodiments, the computer executable code is configured to obtain the 3D model of the product by: receiving an identification of the product; and retrieving the 3D model of the product from an e-commerce server.

In certain aspects, the present invention relates to a method for realizing multi-user augmented reality. In certain embodiments, the method includes: receiving, by a computing device, product information of a product from a primary computing device, to obtain three-dimensional (3D) model of the product; receiving, by the computing device, a primary 3D map of environment from the primary computing device; obtaining, by the computing device, secondary images captured by a secondary visual sensor of the computing device; constructing a secondary 3D map of the environment by the computing device based on the obtained secondary images; aligning, by the computing device, the secondary 3D map with the primary 3D map to form an aligned secondary 3D map; and upon receiving a position and orientation of the 3D model in the primary 3D map, placing and rendering the 3D model of the product in a corresponding position and orientation in the updated secondary 3D map by the computing device.

In certain embodiments, the primary 3D map is constructed based on primary images captured by a primary visual sensor of the primary computing device.

In certain embodiments, the method further includes: retrieve the 3D model of the product by the primary computing device based on a selection of a primary user of the primary computing device; sending the 3D model of the product and the primary 3D map of the environment from the primary computing device to the computing device; and establishing a primary-secondary relationship between the primary computing device and the computing device.

In certain embodiments, the step of aligning the secondary 3D map to the primary 3D map is performed by: matching feature points in the secondary 3D map to primary feature points in the primary 3D map to obtain matched feature points; and transforming coordinate system of the secondary 3D map to primary coordinate system of the primary 3D map based on the matched feature points.

In certain embodiments, the method of aligning the secondary 3D map to the primary 3D map includes: fitting a secondary model to the points in the secondary 3D map, fitting a primary model to the points in the primary 3D map, transforming coordinate system of the secondary 3D map to the primary coordinate system of the primary 3D map based on the fitted models. In certain embodiments, the model can be a polygonal mesh or spline surfaces.

In certain embodiments, the step of aligning the secondary 3D map to the primary 3D map by: matching feature points in at least one key frame of the secondary 3D map to feature points in at least one primary key frame of the primary 3D map to obtain matched feature points; and transforming coordinate system of the secondary 3D map to the primary coordinate system of the primary 3D map based on the matched feature points.

In certain embodiments, the primary 3D map and the secondary 3D map are updated at real time, and the method further includes, after the step of aligning: calculating squared distances between matched feature points between the primary 3D map and the aligned secondary 3D map; comparing an average of the squared distances to a predetermined threshold; when the average of the squared distances is greater than the predetermined threshold: capturing additional primary images and secondary images at a common area of the environment, updating the primary 3D map and the secondary 3D map, and performing the step of aligning the secondary 3D map to the primary 3D map again.

In certain embodiments, the method further includes: sending the 3D map from the primary computing device to at least one secondary computing device; constructing, by the secondary computing device, a corresponding 3D map; and aligning, by the secondary computing device, the corresponding 3D map to the primary 3D map.

In certain aspects, the present invention relates to a non-transitory computer readable medium storing computer executable code. The computer executable code, when executed at a processor of a computing device, is configured to: receive information of a product from a primary computing device to obtain three-dimensional (3D) model of the product; receive a primary 3D map of environment from the primary computing device; obtain secondary images captured by a secondary visual sensor of the computing device; construct a secondary 3D map of the environment based on the obtained secondary images; align the secondary 3D map with the primary 3D map to form an aligned secondary 3D map; and upon receiving a position and orientation of the 3D model in the primary 3D map, place and render the 3D model of the product in a corresponding position and orientation in the updated secondary 3D map. In certain embodiments, the computing device doesn't receive at least one of the 3D map and the 3D model (or product ID) directly from the primary computing device. Instead, the primary computing device uploads at least one of the 3D map and the 3D model (or product ID) to a server computing device, and the computing device receives or retrieves the 3D map and/or the 3D model (or product ID) from the server computing device.

In certain embodiments, the computer executable code is configured to align the second 3D map to the primary 3D map by: matching feature points in the secondary 3D map to primary feature points in the primary 3D map to obtain matched feature points; and transforming coordinate system of the secondary 3D map to primary coordinate system of the primary 3D map based on the matched feature points.

In certain embodiments, the computer executable code is configured to align the second 3D map to the primary 3D map by: matching feature points in at least one key frame of the secondary 3D map to feature points in at least one primary key frame of the primary 3D map to obtain matched feature points; and transforming coordinate system of the secondary 3D map to the primary coordinate system of the primary 3D map based on the matched feature points.

In certain aspects, the above method, system, and non-transitory computer readable medium are configured to be used in e-commerce platforms. Specifically, certain embodiments of the present invention are advantageous when used for AR shopping.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
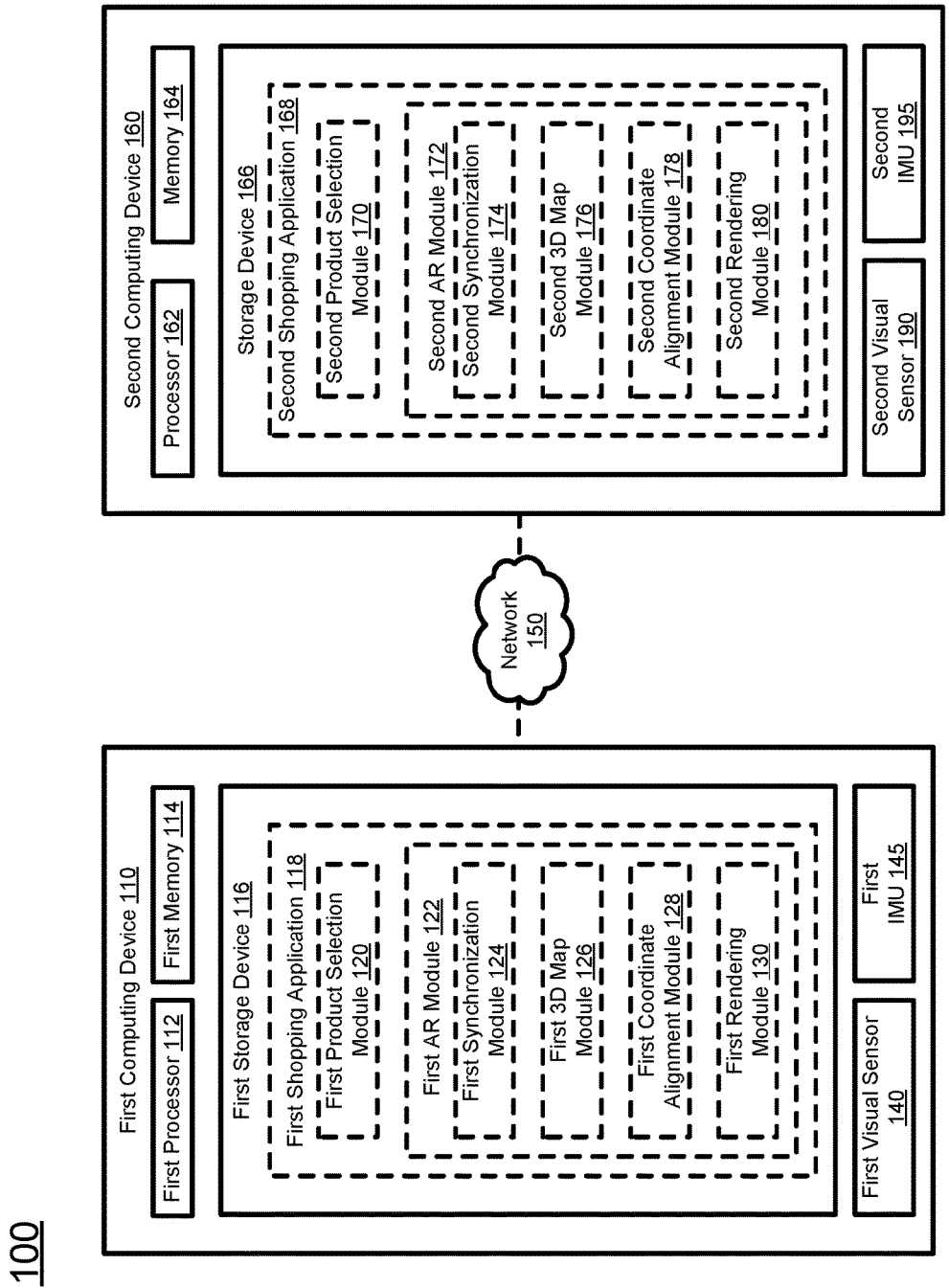
FIG. 1 schematically depicts a multiuser augmented reality (AR) shopping system according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In accordance with the purposes of present invention, as embodied and broadly described herein, in certain aspects, the present invention relates to a solution for multiple users to browse products or even manipulate objects together in an AR shopping session. A typical use scenario is the following: family members or co-workers want to buy an item for their home or office. One of the users finds a product from shopping APP. He/she can "transfer" the product via an "ad-hoc" service to the other users' shopping APPs on their mobile devices. Then, AR shopping sessions launch from all mobile devices. Each camera provides a view of the real physical environment from that user's perspective. Meanwhile, the camera view is augmented with a virtual product rendered on top of the view. With this invention, all mobile devices share the same world coordinate system. The virtual product can be rendered in the common coordinate system; thus providing the illusion that all users are looking at the exact same product from different angles. Moreover, each user can manipulate (e.g., move, rotate) the virtual product. All the other users will instantly see the physically-correct movement on their own screens.

Once the same environment is reconstructed on multiple mobile devices using simultaneous localization and mapping (SLAM), the method according to certain embodiments of the present disclosure aligns the reconstructions (point sets) together using one of a few well-known point set registration algorithms (e.g., Iterative closest point (ICP) or robust point matching (RPM)). The result of the point set registration algorithm is a 3D transformation between the point sets that can transform any point in any mobile device's world coordinate system into the other devices'. In certain embodiments, the method designates one mobile device as the global reference, and registers point sets from all other devices into this global reference system. Once all the mobile devices use the common coordinate system, the method tracks the camera's position and orientation with regard to this reference coordinate system in real time using SLAM method. This allows the virtual object, which is rendered in the global coordinate system, be perceived by multiple users as the "same". The positional relationship between virtual object and physical world is consistent across all mobile devices. Any manipulation on the virtual object by any user can be converted to a 3D transformation applied to the virtual object in the global coordinate system; thus the movement of the virtual object will also be consistent among all mobile devices.

In certain embodiments, the method uses a visual odometry (VO) system for SLAM. The method may only reconstruct the environment up to an arbitrary scale (i.e., all the shapes and relationships among points are correct, but the scale is arbitrary). In this sense, a traditional point set registration algorithm is not sufficient to recover the transformation among point sets. The method can estimate the scale relations among different devices using an optimization method. In certain embodiments, the method can also include the scale as a free parameter in the point set registration algorithm.

In certain embodiments, one key concept of this disclosure is allowing multiple users to browse products and/or manipulate virtual products simultaneously by aligning the underlying reconstructed 3D structures. In certain embodiments, a method can also use the same technology to allow one user or a different user to browse the same 3D model of the product at a different time in a different AR session by storing the first reconstruction on the device's memory, where the AR system may be required to have a long term memory.

In certain embodiments, a method collects photos taken from multiple mobile devices at the same time. The photos may be transferred to a server or to one of the devices. Then, the method can perform multi-view stereo to reconstruct the 3D structure and recover the poses of all devices together.

In certain embodiments, a method of multi-user AR includes the following steps:

1. User one browses the shopping APP and discovers a product of interest. He/she shares the product with other users. In certain embodiments, the method uses an ad-hoc service to transfer the downloaded product information including 3D models via wireless network and/or Bluetooth without using mail or a mass storage device. In certain embodiments, the method sends the Uniform Resource Locator (URL) or an identification number of the product information from one user to other users. Then, product information including 3D models can be downloaded from corresponding e-commerce server by all devices.

2. Each user uses the APP, and in turn uses the underlying visual inertial odometry (VIO) system (e.g, ARKit) to scan the environment. This typically takes a few seconds.

3. Once the structure of the environment is successfully recovered on all devices, the method aligns the point sets computed from multiple mobile devices using one of them as the global reference. The global reference may reside on one of the devices or on a central server.

4. The method checks the error of alignment and compares that with a pre-defined threshold. In certain embodiments, the error term is defined as average of squared distances of corresponding point pairs from two point sets.

5. If the error is too large, the method guides the user to move the mobile device around to obtain a better reconstruction of the environment.

6. If the error is below threshold, the method guides one of the users to place the virtual product in the physical world or automatically place the product in the environment based on the viewpoints of all users.

7. The APPs running on all users' mobile devices continuously track all the cameras' position and orientation using underlying VIO systems. The APPs also track virtual product's translation and rotation with regard to the global coordinate system from users' manipulation.

8. The APPs running on all user's mobile devices render the virtual product on all devices.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

FIG. 1 schematically depicts a multi-user augmented reality shopping system according to certain embodiments of the present invention. As shown in FIG. 1, the system 100 includes a first computing device 110, a second computing device 160, and the first and second computing devices are in communication with each other via a network 150. Each of the first and second computing devices 110 and 160 may be a mobile device, a tablet, a general-purpose computer, a headless computer, a wearable device, a specialized computer, a server computer, a cluster, or a cloud computer, which provides augmented reality services. In certain embodiments, each of the computing devices is preferably one or more mobile devices, such as smart phones, wearable device, or tablets. In certain embodiments, the first and second computing devices 110 and 160 may also be respectively named primary and the secondary computing devices. The system 100 may further include other computing devices that are in communication with the first computing device 110 or/and the second computing device 160. The computing devices in the system 100 may be the same or different in configuration, but all of them has a corresponding shopping application and is able to communicate with each other and share data using the shopping application. In certain embodiments, the network 150 may be a wired or wireless network, and may be of various forms. Examples of the network 150 may include, but is not limited to, a local area network (LAN), a wide area network (WAN) including the Internet, or any other type of networks. The best-known computer network is the Internet.

As shown in FIG. 1, the first computing device 110 may include, without being limited to, a first processor 112, a first memory 114, a first storage device 116, one or more first visual sensors 140, and optionally one or more inertial measurement units (IMUs) 145. In certain embodiments, the first computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The first processor 112 may be a central processing unit (CPU) which is configured to control operation of the first computing device 110. The first processor 112 can execute an operating system (OS) or other applications of the first computing device 110. In some embodiments, the first computing device 110 may have more than one CPU as the processor, such as two CPUs, four CPUs, eight CPUs, or any suitable number of CPUs.

The first memory 114 can be a volatile memory, such as the random-access memory (RAM), for storing the data and information during the operation of the first computing device 110. In certain embodiments, the first memory 114 may be a volatile memory array. In certain embodiments, the computing device 110 may run on more than one first memory 114.

The first storage device 116 is a non-volatile data storage media for storing the OS (not shown) and other applications of the first computing device 110. Examples of the first storage device 116 may include non-volatile memory such as flash memory, memory cards, USB drives, hard drives, floppy disks, optical drives, or any other types of data storage devices. In certain embodiments, the first computing device 110 may have multiple first storage devices 116, which may be identical storage devices or different types of storage devices, and the applications of the first computing device 110 may be stored in one or more of the first storage devices 116 of the first computing device 110. As shown in FIG. 1, the first storage device 116 includes a first shopping application 118. In certain embodiments, the first shopping application 118 provides an augmented reality (AR) function for online shopping. Alternatively, the first shopping application 118 may also be performed offline.

The first shopping application 118 includes, among other things, a first product selection module 120 and a first AR module 122. The first AR module 122 includes a first synchronizing module 124, a first 3D map module 126, a first coordinate alignment module 128 and a first rendering module 130. In certain embodiments, the first shopping application 118 may include other applications or modules necessary for the operation of the modules 120-130. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some of the modules of the first shopping application 118, such as the first 3D map module 126, the first coordinate alignment module 128 and the first rendering module 130, may be located at a remote computing device for example a server computer, and the other modules of the first shopping application 118 communicate with the remote modules via a wired or wireless network.

The first product selection module 120 is configured to provide an interface for a first user to browse products on an e-commerce server, select one or more products that he is interested in, and send the selection to the first synchronization module 124.

The first synchronization module 124 is configured to, upon receiving the selection from the first product selection module 120, retrieve or download the product information from the e-commerce website, and send the product information to the second synchronization module 174. The downloaded product information may include identification of the product, category and name/title of the product, and 3D model of the product. In certain embodiments, as described above, the first product selection module 120 is further configured to send the product information or part of the product information to the second computing device 160. The sending of the product information may be in a form of a pushed notification. In response to receiving the push notification having product information, the second computing device 160 launches the second shopping application 168. After the second shopping application 168 is in operation, the second synchronization module 170 is configured to extract the product information from the notification. In certain embodiments, the first synchronization module 124 may only send the identification or URL of the product to the second computing device 160, and the second synchronization module 174, upon extracting the identification or the URL from the notification, download all the product information from the e-commerce server. Further, the second synchronization module 174 is configured to send a request to the first synchronization module 124, and communicate with the first synchronization module 124 to establish a primary-secondary relationship between the first computing device 110 and the second computing device 160, where the first computing 110 is determined to be the primary device and the second computing device 160 is determined to be the secondary device. In certain embodiments, the first and second shopping applications 118 and 168 may also provide options for the users to determine the primary-secondary relationship arbitrarily. Once the primary-secondary relationship is established, the first synchronization module 124 and the second synchronization module 174 are configured to synchronize the clocks of the two computing devices. In certain embodiments, if the first visual sensor 140 and the second visual sensor 190 capture the environment images at different frame rate, the synchronization of the clock makes the communication between the two devices at the same pace and corresponds the first images and the second images based on their capture time.

In certain embodiments, when the first shopping application 118 places the 3D model in the first 3D map, the first synchronization module 124 is configured to communicate the position and orientation of the 3D model in the first 3D map with the second synchronization module 174, and the second synchronization module 174 is configured to place the 3D model into the second 3D map based on the position and orientation of the 3D model in the first 3D map and the transformation between the second 3D map and the first 3D map. The communication between the first synchronization module 124 and the second synchronization module 174 is a two-way communication. Once the 3D model is moved or rotated by one user on his computing device, the transformation of the 3D model is transferred at real time to the other computing device, such that the other device synchronizes the same move or rotation of the 3D model in the corresponding 3D map.

The first 3D map module 126 is configured to, when the primary and secondary relationship between the first and second computing devices 110 and 160 is established, instruct the first visual sensor 140 and the first IMU 145 to collect first images of the environment and IMU information of the first computing device 110, and construct a first 3D map of the environment based on collected first images and optionally the collected IMU information. In certain embodiments, the first 3D environment map module 126 is configured to construct the first 3D map using simultaneous localization and mapping (SLAM), where both the first 3D map of the environment and the poses of the first visual sensor 140 (or poses of the first computing device 110) are obtained. Similarly, the second 3D map module 176 is configured to, when the primary and secondary relationship between the first and second computing devices 110 and 160 is established, instruct the second visual sensor 190 and the second IMU 195 to collect images of the environment and IMU information of the second computing device 160, and construct a second 3D map of the environment. In certain embodiments, the second 3D map module 176 is configured to construct the second 3D map using SLAM, where both the second 3D map of the environment and the poses of the second computing device 160 are obtained. With the continuous capturing of new images by the first and second visual sensors 140 and 190, the first and second 3D map modules 126 and 176 are configured to update the first and second 3D maps. The first 3D map may use the starting position and orientation of the first camera device 110 to establish the coordinate system of the first 3D map, and the second 3D map may use the starting position and orientation of the second camera device 160 to establish the coordinate system of the second 3D map. Thus, the first 3D map and the second 3D map have different coordinate systems. The first and second 3D map modules 126 and 176 are further configured to update the first and second 3D maps at real time. In certain embodiments, the first 3D map may also be named primary 3D map, and the second 3D map may also be named secondary 3D map when it is established that the first and second computing devices have a primary-secondary relationship.

The first coordinate alignment module 128 is configured to send the constructed first 3D map to the second coordinate alignment module 178. Upon receiving the first 3D map, the second coordinate alignment module 178 is configured to align the second 3D map to the first 3D map, and transform the coordinate system of the second 3D map to the coordinate system of the first 3D map. In certain embodiments, the second coordinate alignment module 178 is configured to match the feature points in the second 3D map to the feature points in the first 3D map, and transform the coordinates in the second 3D map to the coordinates in the first 3D map based on the matched feature points. In certain embodiments, first key frames exist during the construction of the first 3D map, and second key frames exist during the construction of the second 3D map. The first coordinate alignment module 128 is configured to send the first key frames or feature points from the first key frames to the second alignment module 178, the second coordinate alignment module 178 is configured to match feature points in the second key frames to the feature points from the first key frames. Based on the correspondence between the first 3D map and the first key frames, and the correspondence between the second 3D map and the second key frames, the second coordinate alignment module 178 is configured to transform the coordinate system of the first 3D map to the coordinate system of the second 3D map. In certain embodiments, the matching between the feature points in the first and second 3D maps or the matching between the feature points in the second images (or key frames) to the first 3D map are also named image registration.

The first rendering module 130 is configured to, after alignment between the first 3D map and the second 3D map is performed, place and render the 3D model to the first 3D map.

In certain embodiments, the first and second shopping applications 118 and 168 may further include a device communication function, which provides interfaces for the communication between the users.

Each of the first visual sensor 140 or the second visual sensor 190 may be one or more cameras for capturing images of the environment. The visual sensors include at least one of grayscale cameras, red, green and blue (RGB) or RGB depth (RGBD) cameras, and depth cameras. The poses of the cameras may be represented as a three-degree translation and a three-degree rotation, and the 3D map may be a point map that is formed as point cloud of feature points. Each feature point has a specific feature descriptor calculated from the corresponding feature point in the 2D images.

In certain embodiments, the system 100 may further includes one or more first and second IMUs 145 and 195 for collect inertial data during the movement of the first and second computing devices 110 and 160. The IMUs may include accelerometers, gyroscopes, and magnetometers. The first and second shopping applications 118 and 168 would instruct the IMUs 170 to collect specific force, angular rate, and optionally magnetic field at real time.

In certain embodiments, each of the first and second rendering modules 130 and 180 is configured to, when the 3D map and the 3D model of the product is available, place and render the 3D model on the 3D map, and providing interactions for the user to operate the 3D model in the 3D map. In certain embodiments, the rendering modules include a texture function to define high frequency detail, surface texture, or color information on the 3D model; a light function to define light on the 3D model; and a collision function to detect and avoid collision when moving the 3D model in the 3D map; and a particle function to use a large number of very small sprites, 3D models, or other graphic objects to simulate certain kinds of "fuzzy" phenomena, such as fire, explosions, smoke, moving water, sparks, clouds, fog, or abstract visual effects like glowing trails, magic spells, etc.

In certain embodiments, the first and second shopping applications 118 and 168 may further include a human-computer interaction module, which is configured to, upon receiving gesture or language from a user, control the 3D model to move in the 3D map.

Figure 2:
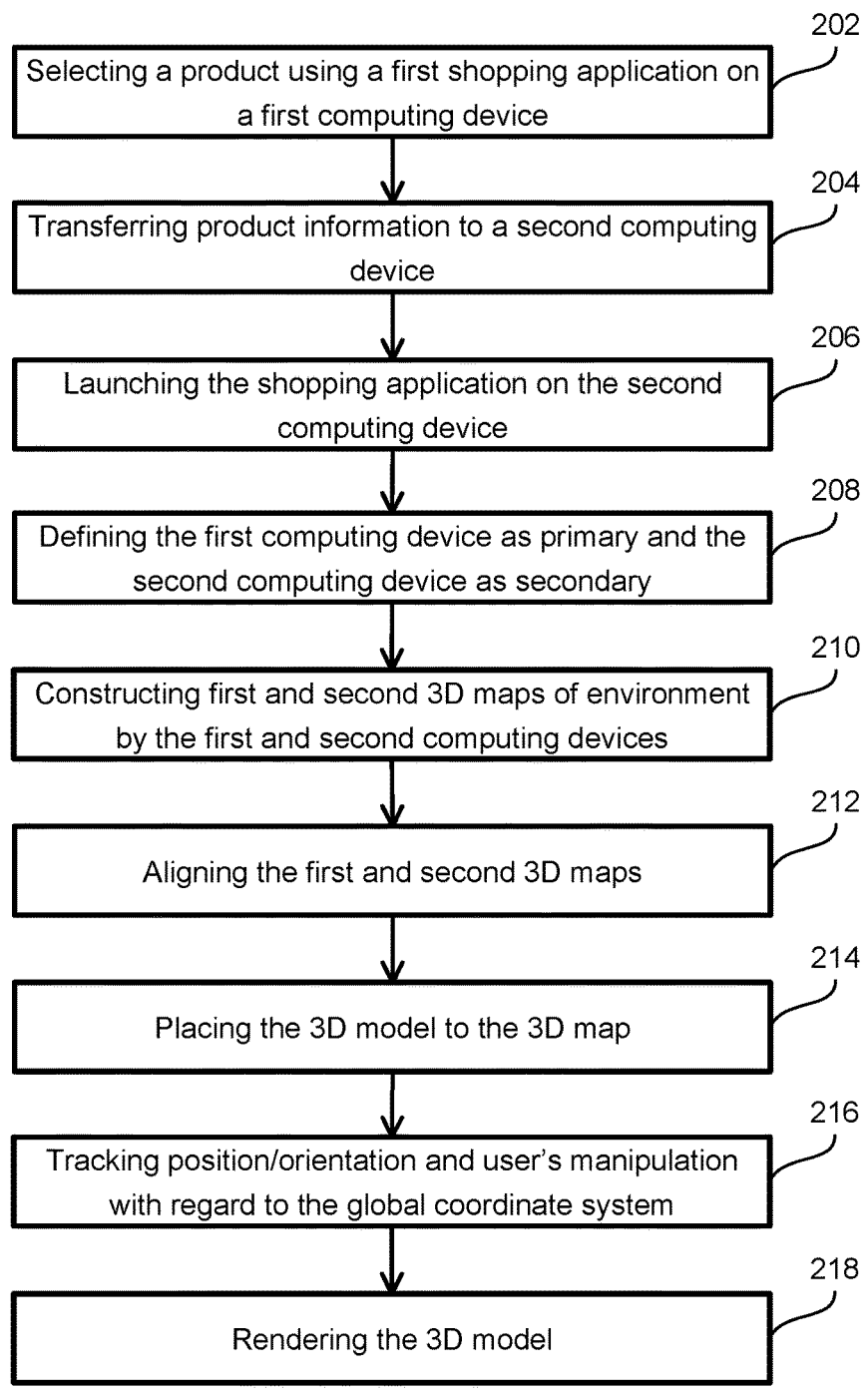
FIG. 2 depicts a flowchart of performing a multi-user AR shopping according to certain embodiments of the present invention.

FIG. 2 depicts a flowchart of multi-user shopping according to certain embodiments of the present invention. In certain embodiments, the method 200 is implemented by the system shown in FIG. 1. It should be particularly noted that, unless otherwise stated in the present invention, the steps of the method may be arranged in a different sequential order, and are thus not limited to the sequential order as shown in FIG. 2.

As shown in FIG. 2, at procedure 202, a first user uses a first computing device 110 to launch the first shopping application 118. The first product selection module 120, when in operation, provides an interface such that the first user can browse one or more e-commerce platforms corresponding to the shopping application 118, and select one or more products of interest through the interface. In response to the selection of the product, the product selection module 120 sends the selection to the first synchronization module 124 of the first AR module 122. In certain embodiments, the production selection 120 may not be a part of the shopping application 118. For example, the first user may use a web browser to browse a website of the e-commerce platform, select the product via the web browser, and send the selected product into the shopping application 118, so as to trigger the initialization of the shopping application 118.

After selection of the product of interest, at procedure 204, the first synchronizing module 124 downloads the product information from the e-commerce platform and sends the product information or part of the product information to the second computing device 160. The product information may be sent in a form of a pushed notification. The pushed notification may include a complete entry of registered information of the product or simply an identification or URL of the product. The registered information, which are provided by the seller and/or the e-commerce platform, may include identification, category, name, description, and 3D model of the product. In certain embodiments, the pushed notification may include other functions such as triggering initialization of the AR shopping application installed on the second computing device 160.

At procedure 206, in response to receiving the notification from the first computing device 110, the second computing device 160 launches the second shopping application 168. After initialization of the second shopping application 168, the second synchronization module 174 extracts the product information from the notification. If the extracted information is a part of product information, for example only the identification or URL of the product, the second synchronization module 174 further downloads other necessary product information from the e-commerce server. The necessary information may include category, name, 3D model, and material of the product.

At procedure 208, when the second shopping application 168 is initialized and the product information is downloaded, the second synchronizing module 174 sends a request to the synchronizing module 124, to establish a primary-secondary relationship between the first computing device 110 and the second computing device 160, where the first computing device 110 is determined to be the primary device and the second computing device 160 is determined to be the secondary device. In certain embodiments, when more than two computing devices are connected, the synchronizing modules of those computing devices may define one as primary device and all the other as secondary devices. In certain embodiments, the primary and the secondary relationship may also be switched using an instruction generated by the users. The first and second synchronization modules 124 and 174 respectively send the primary-secondary relationship to the first and second 3D map modules 126 and 176. In certain embodiments, the procedure 208 may also include synchronization of the clocks between the two computing devices.

Then at procedure 210, in response to receiving the primary-secondary relationship from the first synchronization module 124, the first 3D map module 126 instructs the first visual sensor 140 to capture images of the environment, instructs the first IMU 145 to collect IMU information of the first computing device 110, and constructs a first 3D map of the environment and obtains the poses of the first computing device 110 based on the captured images and the collected IMU information. In certain embodiments, the first 3D map module 126 constructs the first 3D map using SLAM. Similarly, in response to receiving the primary-secondary relationship from the second synchronization module 174, the second 3D map module 176 instructs the second visual sensor 190 to capture images of the environment, instructs the second IMU 195 to collect IMU information of the second computing device 160, and constructs a second 3D map of the environment and obtains poses of the second computing device 160 based on the captured images and the collected IMU information. In certain embodiments, the second 3D map module 176 constructs the second 3D map using SLAM. The first 3D map may use the starting position and orientation of the first camera device 110 to establish the coordinate system of the first 3D map, and the second 3D map may use the starting position and orientation of the second camera device 160 to establish the coordinate system of the second 3D map. Thus, the first 3D map and the second 3D map have different coordinate systems. In certain embodiments, the visual sensors 140 and 190 have overlapped field of view. In other words, the first visual sensor 140 and the second visual sensor 190 at least capture images of some common areas of the environment. Correspondingly, the first 3D map and the second 3D map include feature points corresponding to common area of the environment. After construction of the first and second 3D maps, the first 3D map module 126 and the second 3D map module 176 respectively notify the first and second coordinate alignment modules 128 and 178.

In response to receiving the notifications that the first and second 3D maps are constructed, at procedure 212, the first and second coordinate alignment modules 128 and 178 align the first and second 3D maps. In certain embodiments, the first coordinate alignment module 128 sends the first 3D map to the second coordinate alignment module 178, and upon receiving the first 3D map, the coordinate alignment module 178 compares the feature points in the first 3D map and the second 3D map to locate matched feature points and then align the second 3D map to the first 3D map by transforming the coordinates of the second 3D map to the coordinates in the first 3D map. In certain embodiments, first key frames exist during the construction of the first 3D map, and second key frames exist during the construction of the second 3D map. The first coordinate alignment module 128 sends the first key frames or the feature points from the key frames to the second alignment module 178, the second coordinate alignment module 178 matches feature points in the second key frames to the feature points from the first key frames. Based on the correspondence between the first 3D map and the first key frames, and the correspondence between the second 3D map and the second key frames, the second coordinate alignment module 178 transforming the coordinate system of the first 3D map to the coordinate system of the second 3D map.

In certain embodiments, the alignment between the first and second 3D map includes determining a rigid transformation, making a surface representation using feature points and matching the surface representation, and optimizing the matched and optionally unmatched points.

In certain embodiments, the transformation that used to align the second (secondary) 3D map with the first (primary) 3D map is a rigid transformation in 3D space, which comprises of a rotation and a translation. The rotation has three degrees of freedom (DOF) and the translation has three DOF. In certain embodiments, a virtual inertial odometry (VIO) method is applied, which can estimate the ground plane using IMUs. The Y axis of the coordinate system of the second 3D map and the Y axis of the coordinate system of the first 3D map point to the opposite direction of gravity, and the rotation part of the rigid transformation only has one DOF. Accordingly, it is easier to align the second 3D map with the first 3D map. In certain embodiments, the alignment is computed by minimizing an error term. In certain embodiments, the error term can be calculated as average of the squared distances between corresponding feature points. In another embodiments, the error term can be defined as average of the squared distances between sampled points from parametric surface models of the first 3D map and the second 3D map.

In certain embodiments, the structure representation and similarity measure mainly includes feature-based, point-based, and model-based surface representation. In certain embodiments, for feature-based methods, feature refers to compact description of the surface shape. When the features can be matched by comparing scalar values, the transformation can be easily computed directly, for example, by calculating the least squares. In certain embodiments, different transformation methods as described in "Estimating 3-D rigid body transformations: a comparison of four major algorithms" by D. W. Eggert and A Lorusso, R. B. Fisher is applied, which is incorporated herein by reference in its entirety.

In certain embodiments, for a point-based method, all or a subset of points are used. Similarity criterion is the average distance to be minimized between pairs of surface points. In certain embodiments, the correspondence is not known beforehand, but can be recovered by the algorithm during the process. In one example, iterative closest point (ICP) is applied to minimize the difference between two clouds of points consisted in the two 3D maps.

In certain embodiments, the structure representation and similarity measure may further include a method based on global similarity. In certain embodiments, the method registers surfaces on the basis of global surface geometry, that do not rely on a rough prior estimation of the transformation and that may be able to deal with relatively featureless patches.

For further discussion of automatic 3D surface registration, please refer to "An algorithmic overview of surface registration techniques for medical imaging" by Michel Audette et al, which is incorporated herein by reference in its entirety.

The choice of different representations leads to different matching and optimizing method. For feature based approach, feature matching and direct computation is sufficient. For point-based approach, the matching and optimizing may involve iteratively finding the closest points and optimization that minimizes surface-to-surface distance. For model-based approach, surface evolution models can be used or finite element modeling can be applied to model the surfaces.

After a round of alignment, the second coordinate alignment module 178 calculates the alignment error and determines whether the error is greater than a pre-determined threshold. In certain embodiments, the alignment error is defined as the average of squared distances of corresponding point pairs from the two point sets. If the error is greater than the threshold, the second coordinate alignment module 178 sends a notification to the second user, and sends the notification to the first user via the coordinate alignment module 128, such that the first user and the second user can capture more images of the environment, preferably images of common areas. The first 3D map module 126 updates the first 3D map and the second 3D map module 176 updates the second 3D map based on the newly added images. In certain embodiments, the coordinate alignment modules 128 and 178 may provide guidance to capture images based on the alignment result. In certain embodiments, the coordinate alignment modules 128 and 178 provide guidance by leading the first user and the second user to a common area in the environment.

When the alignment error is less than a predetermined threshold, at procedure 214, the coordinate alignment module 178 sends a notification to the first user via the coordinate alignment module 128 or sends a notification directly to the second user, and requests the first user to place the 3D model of the product of interest to the first 3D map. In certain embodiments, the second coordinate alignment module 178 may allow the second user to place the 3D model into the second 3D map instead of the first user. In certain embodiments, the shopping application 118 may also automatically place the 3D model in the environment based on at least one of the first and second 3D maps. The first synchronizing module 124 and the second synchronization module 174 communicate with each other, so that when the 3D model is placed in one of the first and second 3D maps and the position and orientation of the 3D model is defined, the position and orientation can be used to place the 3D model in the other one of the first and second 3D maps. Because the first 3D map and the second 3D map, after alignment, share the same coordinates system, the placing of the 3D model in the two 3D maps is straightforward.

Then the users may move the first and second computing devices 110 and 160 in the environment, the first and second visual sensors 140 and 190 keep capturing new images, and the users may manipulate the 3D model in the environment. Now at procedure 216, the first 3D map module 126 and the second 3D map module 176 track position/orientation and user manipulation with regard to the global coordinate system.

Further, at procedure 218, the first rendering module 130 and the second rendering module 180 also render the 3D model in the 3D maps.

Figure 3:
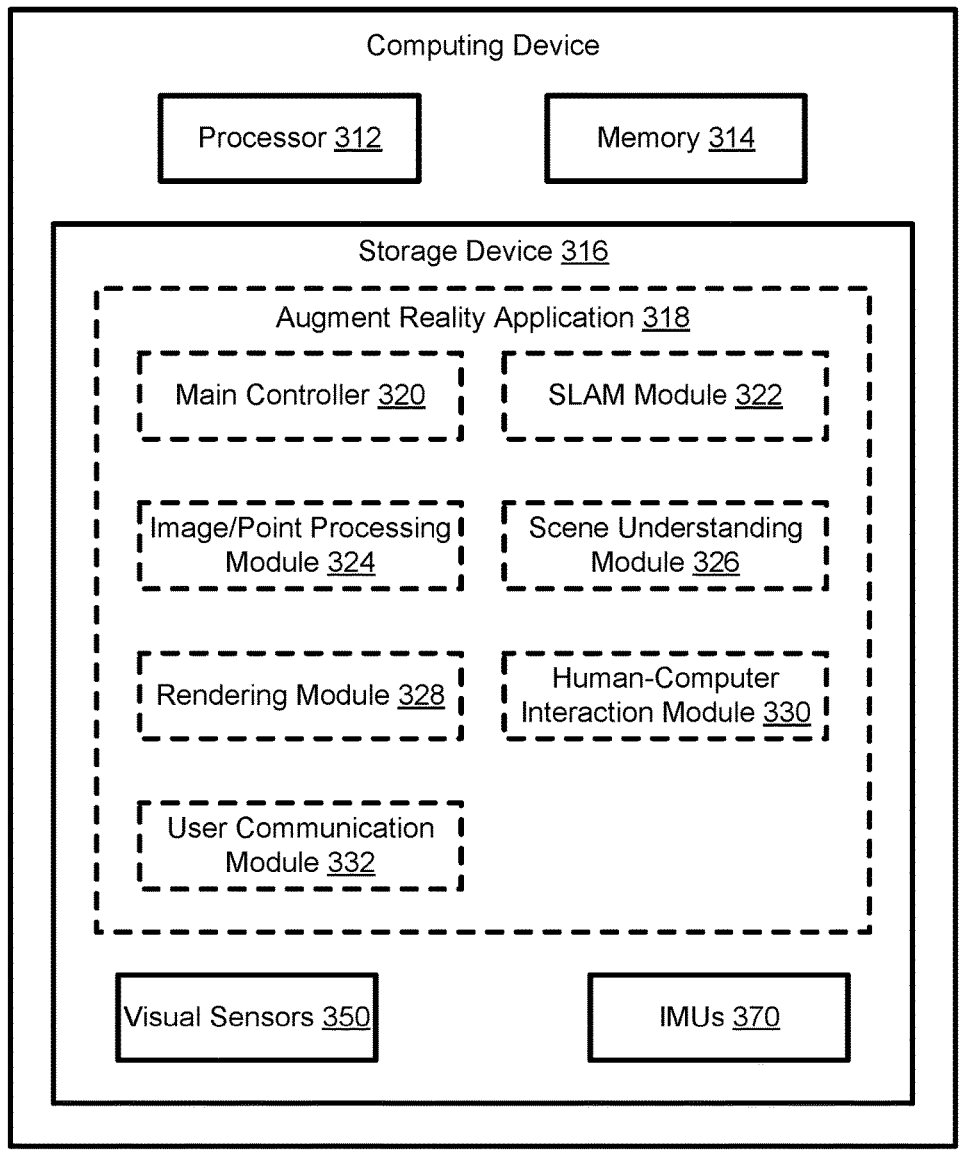
FIG. 3 schematically depicts a computing device according to certain embodiments of the present invention.

FIG. 3 schematically depicts a computing device according to certain embodiments of the present invention. In certain embodiments, the computing device 300 may be a mobile device, a tablet, a general-purpose computer, a headless computer, a wearable device, a specialized computer, a server computer, a cluster, or a cloud computer, which provide augmented reality services. In certain embodiments, the computing device 300 is preferably one or more mobile devices, such as smart phones, wearable device, or tablets. As shown in FIG. 3, the computing device 300 may include, without being limited to, a processor 312, a memory 314, a storage device 316, one or more visual sensors 350, and optionally one or more inertial measurement units (IMUs) 370. In certain embodiments, the computing device 300 may be the same as or similar to any of the first and second computing devices 110 and 160 shown in FIG. 1.

The AR application 318 includes, among other things, a main controller 320, a simultaneous localization and mapping (SLAM) module 322, an image/point processing module 324, a scene understanding module 326, a rendering module 328, a human-computer interaction module 330, and a user communication module 332. In certain embodiments, the AR application 318 may include other applications or modules necessary for the operation of the modules 320-332. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some of the modules of the AR application 318, such as the scene understanding module 326, may be located at a remote computing device for example a server computer, and the other modules of the AR application 118 communicate with the scene understanding module 326 via a wired or wireless network.

The main controller 320 is configured to communicate with the visual sensor 350, the IMU 370, and other modules of the AR application 318. The SLAM module 322 is configured to calculate poses of the visual sensor 350 (or the computing device 300) and construct 3D map of the environment based on images captured by the visual sensor 350. The image/point processing module 324 is configured to extract features from 2D images, and detect and fit planes from point clouds. The scene understanding module 326 is configured to detect and recognize objects in the 2D images based on the features and segmentations of the 2D images, and project the recognized objects in the 2D images to the 3D map. The rendering module 328 is configured to place and render a 3D model of a product on the 3D map. The human-computer interaction module 330 is configured to, upon receiving gesture or language from a user, control the 3D model to move in the 3D map. The user communication module 332 is configured to construct real time communication between different users, or in other words, between different computing devices, to perform the function of synchronizing different computing devices, aligning coordinates between 3D maps from different computing devices, as described above in relative to FIGS. 1 and 2.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system for realizing multi-user augmented reality, comprising:
   a computing device comprising a secondary visual sensor, a processor and a storage device storing computer executable code, and the computer executable code, when executed at the processor, is configured to:
   receive information of a product from a primary computing device to obtain a three-dimensional (3D) model of the product;
   receive a primary 3D map of an environment from the primary computing device;
   obtain secondary images captured by the secondary visual sensor;
   construct a secondary 3D map of the environment based on the obtained secondary images;
   align the secondary 3D map with the primary 3D map to form an aligned secondary 3D map; and
   upon receiving a position and orientation of the 3D model in the primary 3D map, place and render the 3D model of the product in a corresponding position and orientation in the updated secondary 3D map.

2. The system of claim 1, wherein the primary computing device comprises a primary visual sensor, and is configured to construct the primary 3D map based on primary images captured by the primary visual sensor.

3. The system of claim 2, wherein the primary computing device further comprises a primary processor and a primary storage device storing primary computer executable code, and the primary computer executable code, when executed at the primary processor, is configured to:
   retrieve the 3D model of the product based on a selection of a primary user of the primary computing device;
   send the 3D model of the product and the primary 3D map of the environment to the computing device; and
   establish a primary-secondary relationship with the computing device.

4. The system of claim 1, wherein the computer executable code is configured to align the secondary 3D map to the primary 3D map by:
   matching secondary feature points in the secondary 3D map to primary feature points in the primary 3D map to obtain matched feature points; and
   transforming a coordinate system of the secondary 3D map to a primary coordinate system of the primary 3D map based on the matched feature points.

5. The system of claim 1, wherein the computer executable code is configured to align the secondary 3D map to the primary 3D map by:
   matching feature points in at least one key frame of the secondary 3D map to feature points in at least one primary key frame of the primary 3D map to obtain matched feature points; and
   transforming a coordinate system of the secondary 3D map to a primary coordinate system of the primary 3D map based on the matched feature points.

6. The system of claim 1, wherein the primary 3D map and the secondary 3D map are updated at real time, and the computer executable code is further configured to evaluate the alignment between the secondary 3D map and the primary 3D map by:
   calculating squared distances between matched feature points between the primary 3D map and the aligned secondary 3D map;
   comparing an average of the squared distances to a predetermined threshold; and
   when the average of the squared distances is greater than the predetermined threshold, performing the step of aligning the secondary 3D map to the primary 3D map again after a predetermined period of time.

7. The system of claim 6, wherein when the average of the squared distances is greater than the predetermined threshold, the primary computing device and the computing device are configured to guide users to capture primary images and secondary images at a common area of the environment.

8. The system of claim 1, wherein the primary computing device further comprises a primary inertial measure unit (IMU) for collecting primary inertial information, the computing device further comprises a secondary IMU for collecting secondary inertial information, the primary computing device is configured to construct the primary 3D map and determine poses of the primary computing device based on the captured primary images and the collected primary inertial information, and the computing device is configured to construct the secondary 3D map and determine poses of the computing device based on the captured secondary images and the collected secondary inertial information.

9. The system of claim 1, further comprising at least one secondary computing device in communication with the primary computing device, wherein the at least one secondary computing device is configured to align its 3D map with the primary 3D map.

10. The system of claim 1, wherein the computer executable code is configured to obtain the 3D model of the product by:
    receiving an identification of the product; and
    retrieving the 3D model of the product from an e-commerce server.

11. A method for realizing multi-user augmented reality, the method comprising:
    receiving, by a computing device, product information of a product from a primary computing device, to obtain a three-dimensional (3D) model of the product;
    receiving, by the computing device, a primary 3D map of an environment from the primary computing device;
    obtaining, by the computing device, secondary images captured by a secondary visual sensor of the computing device;
    constructing a secondary 3D map of the environment by the computing device based on the obtained secondary images;
    aligning, by the computing device, the secondary 3D map with the primary 3D map to form an aligned secondary 3D map; and
    upon receiving a position and orientation of the 3D model in the primary 3D map, placing and rendering the 3D model of the product in a corresponding position and orientation in the updated secondary 3D map by the computing device.

12. The method of claim 11, wherein the primary 3D map is constructed based on primary images captured by a primary visual sensor of the primary computing device.

13. The method of claim 12, further comprising:
retrieve the 3D model of the product by the primary computing device based on a selection of a primary user of the primary computing device;
sending the 3D model of the product and the primary 3D map of the environment from the primary computing device to the computing device; and
establishing a primary-secondary relationship between the primary computing device and the computing device.

14. The method of claim 11, wherein the step of aligning the secondary 3D map to the primary 3D map is performed by:
matching feature points in the secondary 3D map to primary feature points in the primary 3D map to obtain matched feature points; and
transforming a coordinate system of the secondary 3D map to a primary coordinate system of the primary 3D map based on the matched feature points.

15. The method of claim 11, wherein the step of aligning the secondary 3D map to the primary 3D map by:
matching feature points in at least one key frame of the secondary 3D map to feature points in at least one primary key frame of the primary 3D map to obtain matched feature points; and
transforming a coordinate system of the secondary 3D map to a primary coordinate system of the primary 3D map based on the matched feature points.

16. The method of claim 11, wherein the primary 3D map and the secondary 3D map are updated at real time, and the method further comprising, after the step of aligning:
calculating squared distances between matched feature points between the primary 3D map and the aligned secondary 3D map;
comparing an average of the squared distances to a predetermined threshold;
when the average of the squared distances is greater than the predetermined threshold: capturing additional primary images and secondary images at a common area of the environment, updating the primary 3D map and the secondary 3D map, and performing the step of aligning the secondary 3D map to the primary 3D map again.

17. The method of claim 11, further comprising:
sending the 3D map from the primary computing device to at least one secondary computing device;
constructing, by the secondary computing device, a corresponding 3D map; and
aligning, by the secondary computing device, the corresponding 3D map to the primary 3D map.

18. A non-transitory computer readable medium storing computer executable code, wherein the computer executable code, when executed at a processor of a computing device, is configured to:
receive information of a product from a primary computing device to obtain a three-dimensional (3D) model of the product;
receive a primary 3D map of an environment from the primary computing device; obtain secondary images captured by a secondary visual sensor of the computing device;
construct a secondary 3D map of the environment based on the obtained secondary images;
align the secondary 3D map with the primary 3D map to form an aligned secondary 3D map; and
upon receiving a position and orientation of the 3D model in the primary 3D map, place and render the 3D model of the product in a corresponding position and orientation in the updated secondary 3D map.

19. The non-transitory computer readable medium of claim 18, wherein the computer executable code is configured to align the second 3D map to the primary 3D map by:
matching feature points in the secondary 3D map to primary feature points in the primary 3D map to obtain matched feature points; and
transforming a coordinate system of the secondary 3D map to a primary coordinate system of the primary 3D map based on the matched feature points.

20. The non-transitory computer readable medium of claim 18, wherein the computer executable code is configured to align the second 3D map to the primary 3D map by:
matching feature points in at least one key frame of the secondary 3D map to feature points in at least one primary key frame of the primary 3D map to obtain matched feature points; and
transforming a coordinate system of the secondary 3D map to a primary coordinate system of the primary 3D map based on the matched feature points.

* * * * *